Sept. 6, 1966 T. E. HAWKINS ETAL 3,270,603
TUBE CUTTING MECHANISM
Filed Feb. 18, 1964 3 Sheets-Sheet 1
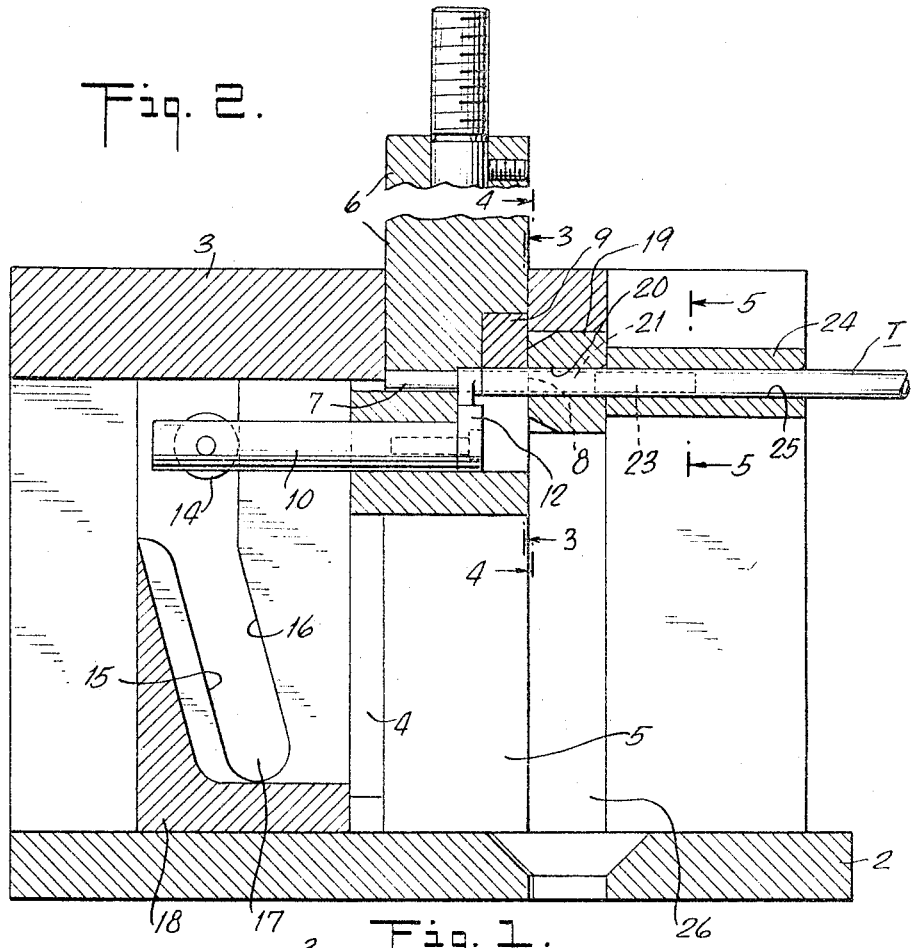
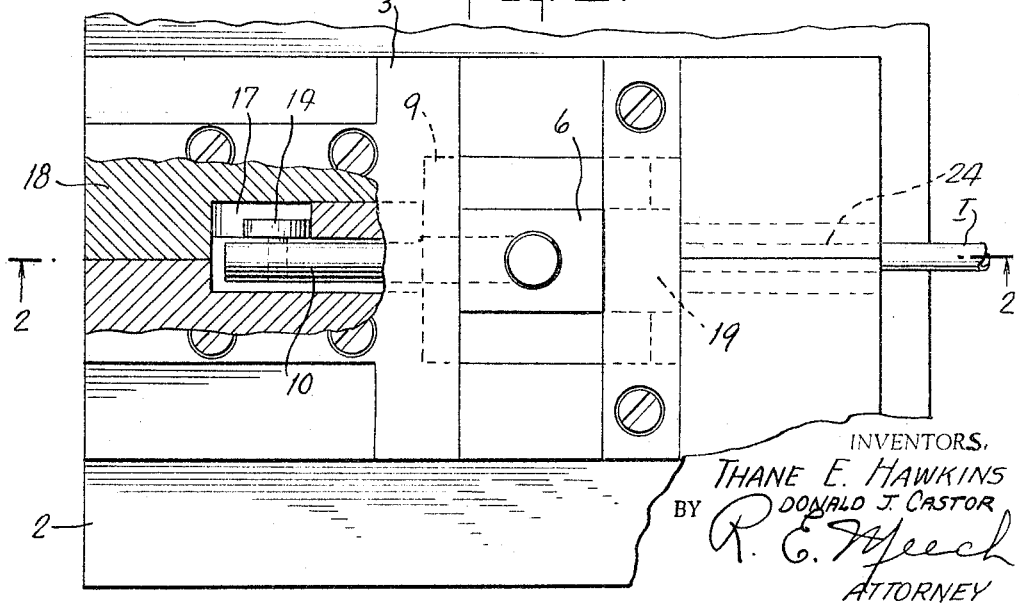
INVENTORS.
THANE E. HAWKINS
DONALD J. CASTOR
BY R. E. Meech
ATTORNEY

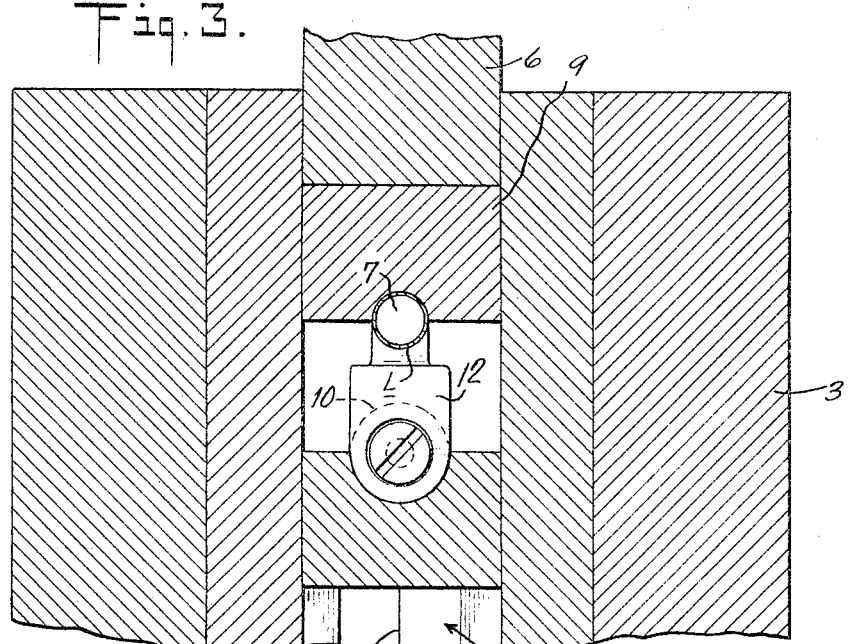
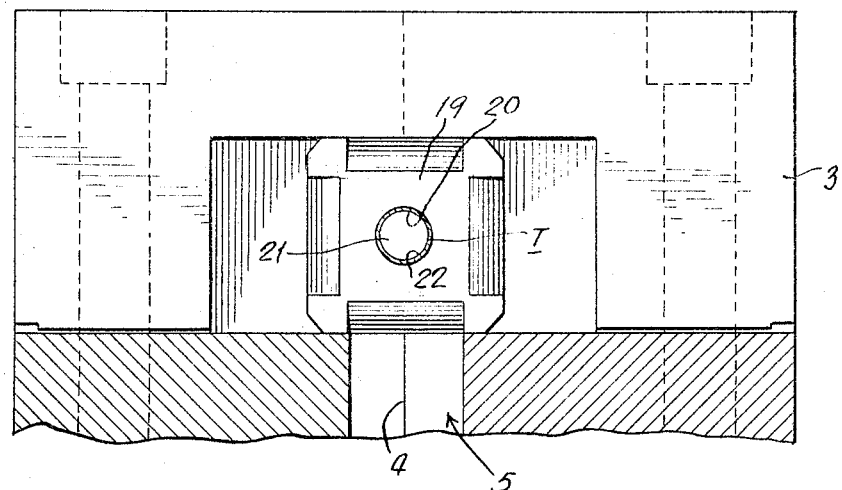
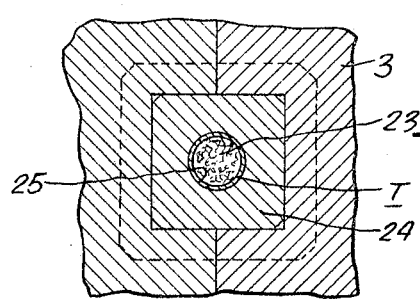

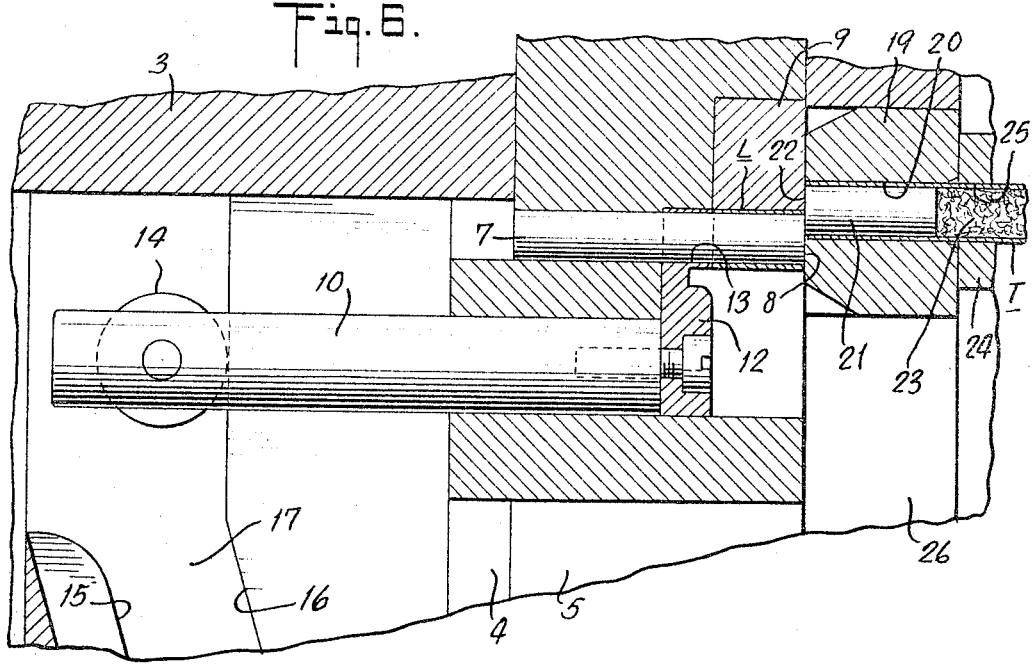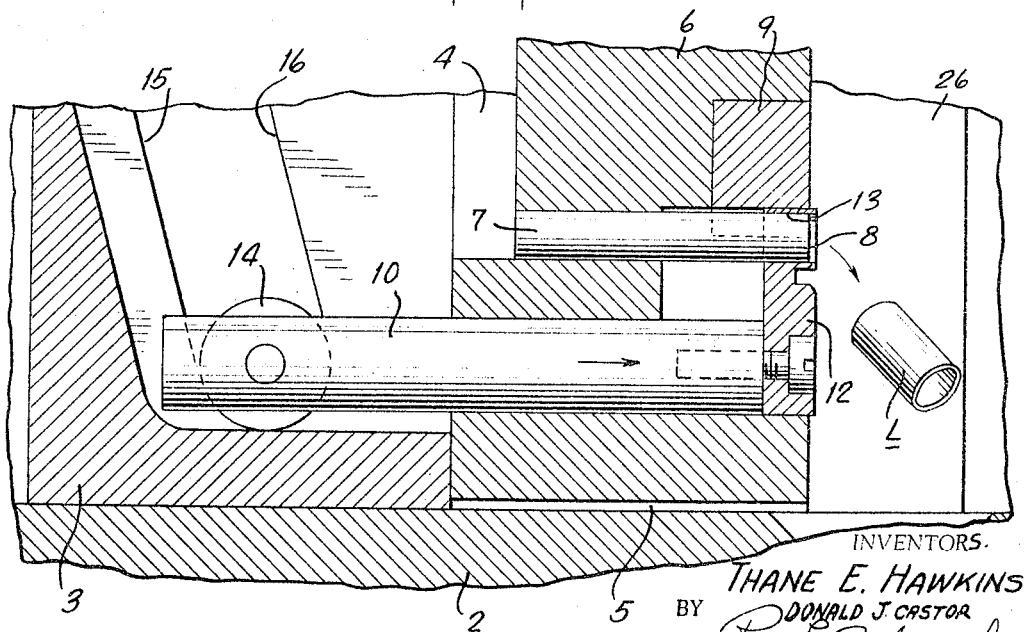

United States Patent Office 3,270,603
Patented Sept. 6, 1966

3,270,603
TUBE CUTTING MECHANISM
Thane E. Hawkins and Donald J. Castor, Meadville, Pa., assignors to Talon, Inc., a corporation of Pennsylvania
Filed Feb. 18, 1964, Ser. No. 345,622
12 Claims. (Cl. 83—127)

This invention relates to the cutting of continuous length tubing and more particularly, to improved mechanism for transversely severing such tubing into desired length.

Various types of apparatus and mechanisms have heretofore been suggested and used for cutting continuous length tubing transversely so as to provide individual pieces of the desired length but they have not been entirely satisfactory for the following reasons; burrs were formed on the cut edges, the walls of the tubing were distorted, chips or other waste material resulted, or the cut lengths were not held within the proper tolerances. It is to an improved mechanism for transversely cutting such tubing to eliminate the above disadvantages of such other apparatus and mechanism that the present invention relates.

Accordingly, it is the general object of the present invention to provide an improved mechanism for transversely cutting continuous length thin-walled tubing into individual pieces of the desired length whereby the cut lengths can be controlled within relatively close tolerances and a minimum burr resulting so that a relatively clean and acceptable product is obtained.

It is another object of this invention to provide an improved tube cutting mechanism which is simple and inexpensive in its construction and maintenance and at the same time, efficient and effective in its use.

It is a further object of this invention to provide improved tube cutting mechanism wherein the tube is severed both from the inside wall and the outside wall to insure a clean cut with practically no burr and no distortion of the tube.

It is a more specific object of the present invention to provide an improved tube cutting mechanism wherein a floating mandrel is disposed within the end of the tubing to be cut having a cutting edge which cooperates with an external cutting member to sever the tube which mandrel is held in cutting position by yieldable means arranged within the tubing rearwardly of the mandrel.

Various other objects and advantages of this invention will be more apparent in the course of the following specification, and will be particularly pointed out in the appended claims.

In the accompanying drawings, there is shown for the purpose of illustration, an embodiment which the invention may assume in practice.

In these drawings:

FIG. 1 is a fragmentary plan view, partly in section, of the improved tube cutting mechanism in accordance with the present invention, FIG. 2 is a sectional view taken on line 2—2 of FIG. 1, showing the various parts of the mechanism in their normal positions, FIG. 3 is an enlarged sectional view taken on line 3—3 of FIG. 2, FIG. 4 is an enlarged sectional view taken on line 4—4 of FIG. 2, FIG. 5 is an enlarged sectional view taken on line 5—5 of FIG. 2, FIG. 6 is an enlarged vertical sectional view similar to FIG. 2, showing the initial downward movement of the ram and the cutting of a length of tubing from the end of the continuous length tubing, and FIG. 7 is an enlarged sectional view similar to FIG. 7, showing the ram at the end of its downward travel and the stripping of a cut length of tubing from the end of the stationary mandrel.

Referring more particularly to the drawings, the improved mechanism in accordance with the present invention consists of a base or bed plate 2 upon which there is mounted a block-like base frame construction or die assembly 3. Centrally of this frame 3, there is arranged in suitable guideways 4 in the side walls of an opening 5 therein, a reciprocating ram 6.

In this ram 6, there is suitably mounted a cylindrical stationary mandrel 7 over and around which the end of the continuous length of tubing T is adapted to be disposed and which acts as an internal cutter having a cutting edge on the inner end thereof, as at 8. There is mounted on the side of this ram 6, an external cutter or die 9 which is arranged circumferentially partially around the tubing T to be cut and the stationary mandrel 7 disposed therein.

There is also carried by the ram 6, a transversely extending reciprocable rod 10 on the inner end of which there is arranged a stripping member 12 having an aperture 13 arranged therein through which the stationary mandrel 7 extends. This member 12 not only acts to strip a cut length L from the stationary mandrel 7 after the cutting operation but also acts as an abutment stop against which the end of the tubing abuts to position the end of the tubing relative to the cutting means whereby predetermined lengths of tubing are cut from the continuous length. On the outer end of this rod 10 there is arranged a roller 14 which cooperates with the cam surfaces 15 and 16 on the sides of a slotted opening 17 arranged in a member 18 mounted in the base frame 3 in a manner and for a purpose hereinafter to be described.

In the base frame 3 to one side of the ram 6, there is arranged a stationary external cutter or die 19 having an aperture 20 arranged therein into and through which the tubing is adapted to pass. Within the tubing T and this external cutter 19 which encircles the same there is arranged a cylindrical floating mandrel 21 having an inner cutting edge, as at 22. That is to say, this mandrel 21 floats or is adapted to be moved axially relative to the tubing and the aperture 20 in the external cutter 19. Rearwardly of this mandrel 21, there is arranged a cylindrical member 23 made of felt, rubber or any other suitable yieldable material which fits tightly against the interior wall of the tubing and which is one of the most important aspects of the present invention. It is the purpose of this member 23 to urge or force the cutting edge 22 of the floating mandrel 21 against the inner end and cutting edge 8 of the stationary mandrel 7, or to the left, as shown in FIGS. 2 and 6, for a purpose presently to be described. Also rearwardly of the external cutter 19 there is mounted in the frame 3, an elongated tube guide member 24 having an aperture 25 therein into and through which the tubing is guided into the mechanism. Below the external cutter 19 there is arranged within the frame 3 an opening 26 into which the cut lengths L of tubing are delivered from the end of the stationary mandrel 7 by the stripper member 12 after the cutting operation, as more clearly shown in FIGS. 6 and 7 of the drawings.

Having described the construction of the mechanism in accordance with the present invention, it functions in the following manner.

It will be understood that the mechanism may be actuated manually or, if desired, may be assembled in a conventional punch press or other means and actuated thereby. That is to say, the ram 6 together with the feeding of the continuous length tubing T into the mechanism may be performed automatically rather than manually by any suitable means.

Now as to the operation of the mechanism, it will be assumed that the floating mandrel 21 together with the cylindrical yieldable member 23 have been positioned in the end of the continuous length tubing T as shown in FIG. 2 of the drawings. The tubing T is then positioned in the mechanism by inserting it in and moving it through the aperture 25 in the tube guide 24. The tubing is moved therein and over the stationary mandrel 7 until the free end of the tubing abuts the outer side of the stripper member 12, as shown in FIG. 2 of the drawings. As a result of such movement it will be seen that the inner cutting end 22 of the floating mandrel 21 is moved against the inner cutting end of the stationary mandrel 7 and it will be understood that this floating mandrel 21 is held in such position by the plug or yieldable member 23 due to the frictional contact thereof with the inner wall of the tubing. The tubing is now in readiness to be cut.

The ram 6 together with the external cutter 9 and stationary mandrel 7 carried thereby is then moved downwardly, as shown in FIG. 6, and in such movement it will be seen that the external cutter 9 and the end of the stationary mandrel 7 cooperate with the cutting end 22 of the floating mandrel 21 to sever the tubing. In continued movement of the ram after a cut length of tubing L has been severed from the end of the continuous length tubing T, the roller 14 on the end of the reciprocable rod 10 will be moved into the slotted opening 17 and forced into contact with the cam surface 15 thereof. As a result the rod 10 will be moved to the right, as shown in FIG. 7, whereby the stripper member 12 is moved along the stationary mandrel 7 so as to remove the cut length of tubing L from the mandrel and deliver it into the opening 26 wherein it falls into a suitable container positioned therebelow.

After the ram 6 has travelled to its most downward position, as shown in FIG. 7, it is then moved upwardly and in such movement it will be seen that the roller 14 on the rod 10 contacts the cam surface 16 and in continued movement of the ram this rod 16 will be moved to the left, as shown in FIG. 7, until the ram again reaches its normal position, as shown in FIG. 2. This completes one cycle of operation of the mechanism and the tubing T is then fed into the mechanism as before for the next cutting operation.

An important feature of the mechanism of this invention is the flexibility it provides in cutting tubing of various lengths. To change from cutting tubes of one length to that of another length, it is only necessary to change or adjust the combined stripper and stop member 12 in any suitable manner in its position relative to the rod 14 and to the cutting edge 8 of the mandrel 7 to permit more or less length of tubing T, as desired, to be disposed on the mandrel 7 and in abutment with the combined stripper or stop member 12. Also, in the event various diameters of tubing within a reasonable range are desired to be cut, it will be seen that members 9, 7, 12, 19, 21 and 23 can be easily and conveniently removed and replaced with corresponding members for cutting the particular size tubing desired to be cut.

As a result of our invention, it will be seen that relatively thin-walled continuous length tubing made of copper, brass or other material may be cut into desired lengths by our improved mechanism without any waste or formation of burrs and wherein distortion of the tubing is eliminated and a clean cut will be obtained. It will also be seen that our improved tube cutting mechanism consists of simple and inexpensive parts which are readily interchangeable and easily maintained.

While there is shown and described an embodiment which the invention may assume in practice, it will be understood that this embodiment is merely for the purpose of illustration and description, and that other forms may be devised within the scope of the invention as defined in the appended claims.

We claim:

1. Mechanism for cutting tubing, including in combination, a stationary mandrel over and around which the end of a continuous length of tubing to be cut is adapted to be disposed and which acts as an internal cutter, an external cutter arranged circumferentially around the tubing to be cut and said stationary mandrel, means movable relative to said mandrel for stripping a cut length of tubing therefrom, a floating mandrel arranged directly opposite said stationary mandrel and in alignment therewith which is also adapted to be disposed in the tubing to be cut, and which is adapted to act as an internal cutter, means arranged within the tubing to be cut rearwardly of said floating mandrel which cooperates with the interior wall of said tubing for urging and positioning the floating mandrel toward and against the end of said stationary mandrel, an external cutter arranged circumferentially around the tubing to be cut and the floating mandrel therein, and means for actuating said first external cutter together with said stationary mandrel and the stripping means transversely to the axis of the tubing to be cut whereby a predetermined length of tubing is cut from the end of the continuous length tubing due to the cooperation of the first external cutter and the end of the stationary mandrel with the second external cutter and floating mandrel.

2. The combination as defined in claim 1, wherein the means adapted to be arranged in the tubing to be cut rearwardly of the floating mandrel for urging the same toward and against the end of the floating mandrel consists of a member having yieldable characteristics.

3. The combination as defined in claim 1, wherein the means movable relative to said stationary mandrel for stripping a cut length of tubing therefrom consists of a reciprocating rod carried by said ram which is reciprocally arranged therein for movement in a direction transversely to that of said ram substantially parallel to the tubing adapted to be cut, means arranged on one end of said rod which encircles the stationary mandrel for stripping the cut length of tubing therefrom, and means arranged at the opposite end of said rod for actuating the same.

4. The combination as defined in claim 3, wherein the means for actuating said shaft consists of a roller arranged on the opposite end of said rod which cooperates with camming means arranged adjacent thereto with which said roller cooperates upon movement of said ram.

5. Mechanism for cutting tubing, including in combination, a reciprocating ram, a stationary mandrel arranged in said ram over and around which the end of a continuous length of tubing to be cut is adapted to be disposed and which acts as an internal cutter, an external cutter carried by said ram and arranged circumferentially around both the tubing to be cut and said stationary mandrel, means carried by said ram and movable therewith and relative thereto for stripping a cut length of tubing therefrom, a floating mandrel arranged to one side of said ram directly opposite said stationary mandrel and in alignment therewith which is also disposed within the tubing to be cut, and which is adapted to act as an internal cutter, means arranged within the tubing to be cut rearwardly of said floating mandrel which cooperates with the interior wall of said tubing for urging and positioning the floating mandrel toward and against said stationary mandrel, an external cutter arranged circumferentially around the tubing to be cut and the floating mandrel therein, and said ram upon movement thereof adapted to move said first external cutter carried thereby together with said stationary mandrel and the stripping means transversely to the axis of the tubing to be cut whereby a predetermined length of tubing is cut from the end of the continuous length tubing due to the cooperation of the first external cutter and the end of the stationary mandrel with the second external cutter and floating mandrel.

6. The combination as defined in claim 5, wherein the means adapted to be arranged in the tubing to be cut rearwardly of the floating mandrel for urging the same toward and against the end of the floating mandrel consists of a member having yieldable characteristics.

7. The combination as defined in claim 5, wherein the means carried by the ram and movable relative to the same and to said stationary mandrel for stripping a cut length of tubing therefrom consists of a reciprocating rod carried by said ram which is reciprocally arranged therein for movement in a direction transversely to that of said ram substantially parallel to the tubing adapted to be cut, means arranged on one end of said rod which encircles the stationary mandrel for stripping the cut length of tubing therefrom, and means arranged at the opposite end of said rod for actuating the same.

8. The combination as defined in claim 7, wherein the means for actuating said rod consists of a roller arranged on the opposite end of said shaft which cooperates with camming means arranged adjacent thereto with which said roller cooperates upon movement of said ram.

9. Mechanism for cutting tubing, including in combination, a base member having an opening arranged therein substantially centrally thereof, a ram arranged in said opening for reciprocable movement relative to said base member, a stationary mandrel carried by said ram over and around which the end of continuous length of tubing is adapted to be disposed and which acts as an internal cutter, an external cutter carried by said ram and arranged circumferentially around both the tubing to be cut and said stationary mandrel, means carried by said ram and movable therewith and relative thereto for stripping a cut length of tubing therefrom, a member arranged in said base member to one side of said ram for guiding the tubing into the mechanism, another external cutter arranged in said base member forwardly of said tubing guide member which is arranged circumferentially around the tubing to be cut, a floating mandrel adapted to be arranged in said tubing directly opposite said stationary mandrel and in alignment therewith which is adapted to act as an internal cutter, means arranged within the tubing to be cut rearwardly of said floating mandrel which cooperates with the interior wall of said tubing for urging and positioning the floating mandrel toward and against the end of the stationary mandrel, and said ram upon movement thereof adapted to move said first external cutter carried thereby together with said stationary mandrel and the stripping means in a transverse direction relative to the axis of the tubing to be cut whereby a predetermined length of tubing is cut from the end of the continuous length tubing due to the cooperation of the first external cutter and the end of the stationary mandrel with the second external cutter and floating mandrel.

10. The combination as defined in claim 9, wherein the means adapted to be arranged in the tubing to be cut rearwardly of the floating mandrel for urging the same toward and against the end of the floating mandrel consists of a member having yieldable characteristics.

11. The combination as defined in claim 9, wherein the means carried by said ram and movable relative to the same and to said stationary mandrel for stripping a cut length of tubing therefrom consists of a reciprocating rod carried by said ram which is reciprocally arranged therein for movement in a direction transversely to that of said ram substantially parallel to the tubing adapted to be cut, means arranged on one end of said rod which encircles the stationary mandrel for stripping the cut length of tubing therefrom, and means arranged at the opposite end of said shaft for actuating the same.

12. The combination as defined in claim 11, wherein the means for actuating said shaft consists of a roller arranged on the opposite end of said rod which cooperates with camming means arranged adjacent thereto with which said roller cooperates upon movement of said ram.

References Cited by the Examiner
UNITED STATES PATENTS 2,412,930  12/1946  Walklet _____ 83—188 X
2,428,540  10/1947  Babbitt et al. _____ 83—127

FOREIGN PATENTS 599,873  10/1925  France.

ANDREW R. JUHASZ, *Primary Examiner.*